Jan. 10, 1933.   A. KERNS   1,893,863
AGRICULTURAL IMPLEMENT
Filed Sept. 24, 1930
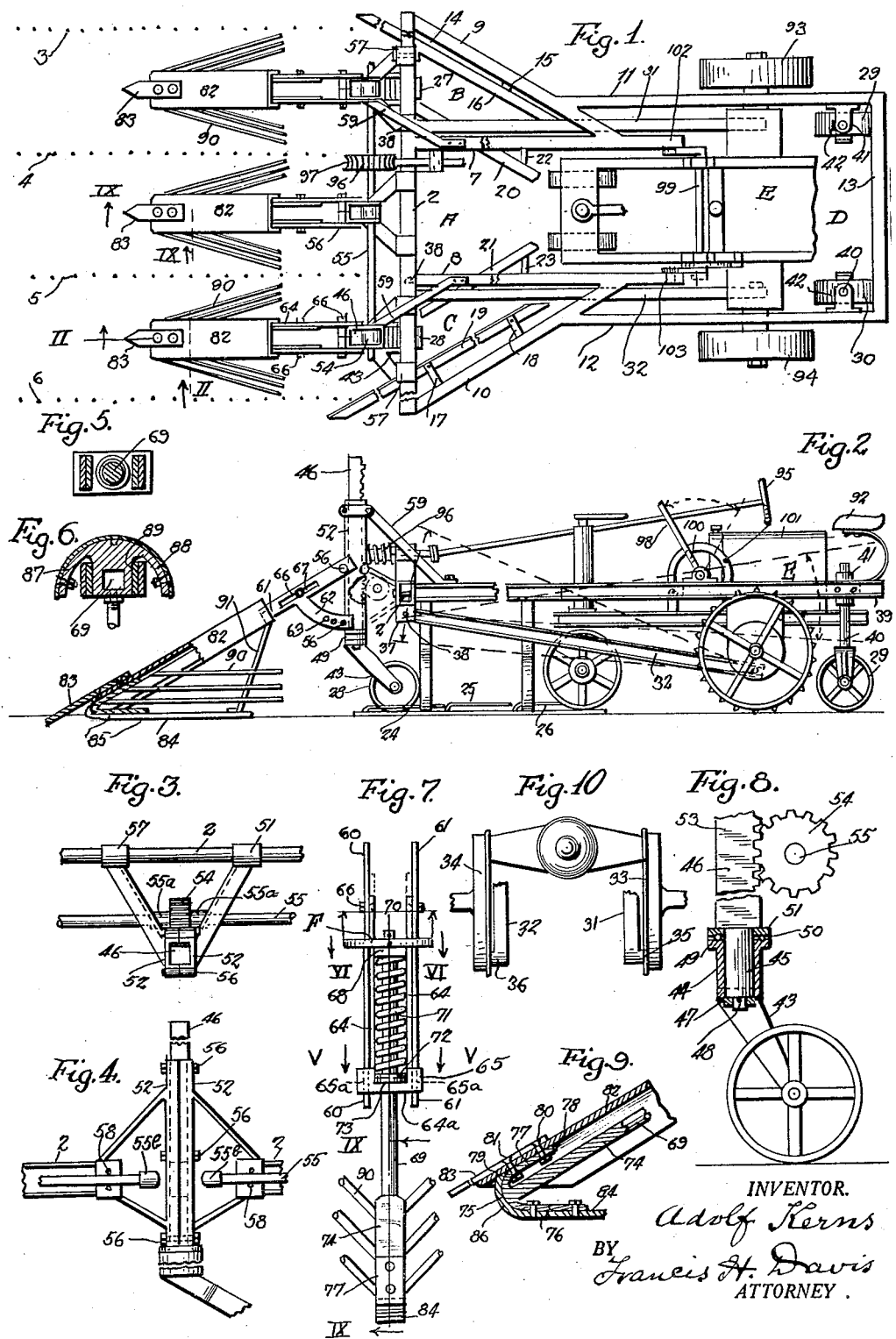
INVENTOR.
Adolf Kerns
BY Francis H. Davis
ATTORNEY.

Patented Jan. 10, 1933

1,893,863

UNITED STATES PATENT OFFICE

ADOLF KERNS, OF GONZALES, CALIFORNIA

AGRICULTURAL IMPLEMENT

Application filed September 24, 1930. Serial No. 484,206.

This invention relates to agricultural machinery and more particularly to an implement for reaping beans, although it may be used as a scuffler for eradicating weeds, and for various other agricultural purposes by substitution of different cutting elements.

The present invention is illustrated as being propelled by a tractor of the well known "Farmall" type, but obviously can be operated by any power adapted to traverse the implement along the rows of crop.

As shown, the implement is provided with a frame or body structure to the under side of which scuffle blades are suitably attached at oblique angles to the rows of plants.

Said blades are of considerable length and it is very desirable that they be capable of scraping along in close contact with the roots of the crop; hence a very important object of my present invention is to provide equalizing means which enable the blades to compensate for irregularities of surface profile, thus allowing said blades to hug close to the ground when dipping into hollows, or conversely, to ride over the rises without digging into them, irrespective of the plane followed by the tractor.

Another important object of my invention is to provide vine-breaking elements adapted to disentangle vines that are interlaced from opposite rows of plants.

Other objects and advantages will later appear, be particularly pointed out in the claims and illustrated in the accompanying drawing, in which:—

Figure 1 is a plan view of the implement.

Figure 2 is a side elevational view with parts cut away for clarity.

Figure 3 is a plan detail of the front-raising elements.

Figure 4 is a front elevational view of Figure 3.

Figure 5 is a section taken on the line V—V of Figure 7.

Figure 6 is a section taken on the line VI—VI of Figure 7.

Figure 7 is a front elevational view of a vine-breaker element with the shield removed.

Figure 8 is a broken, side-elevational detail of the front-raising element with the journal of the wheel shown in vertical mid-section.

Figure 9 is a detail sectional view taken on the line IX—IX of Figure 1.

Figure 10 is a broken rear-end elevational view illustrating the attachment of the apparatus to a tractor.

Similar reference indicia refer to similar parts throughout the several views.

In carrying out my invention I provide a structural frame which according to Figures 1 and 2 comprises the front cross-piece 2 preferably of sufficient length to extend across several rows of beans, in the present instance four, designated 3, 4, 5 and 6. The right and left frame members 7 and 8 respectively, extend rearwardly in parallelism from said cross-piece to bound three sides of the quadrangle A.

The frame member 9 extends rearwardly from the right end-portion of said cross-piece so as to join the member 7 and thereby enclose the right triangle B, whereas the frame member 10 extends rearwardly to join the member 8 and enclose the right triangle C; the members 11 and 12 extending respectively rearwardly in parallelism from the members 9 and 10 to join the rear cross-frame member 13 thereby enclosing the area D, said members are offset from the members 7 and 8 so as to pass between the body of the tractor and the respective wheels 93 and 94.

It will be noted that the construction above set forth comprehends a body structure which, when provided with suitable running gear, can be traveled as an independent vehicle, which will adjust itself to surface conditions of inequality.

To the underside of said structure I secure standards as 14 and 15 to which the scuffle-blade 16 is attached, and the companion standards 17 and 18 to which the scuffle-blade 19 is attached, said blades being arranged to cut the two outer rows 3 and 6 respectively. The respective inner-scuffle-blades 20 and 21 are attached to said structure by standards as 22 and 23 and are arranged to cut the two inner rows of crop 4 and 5 respectively.

All said blades are provided with longitudinally disposed guide-prongs 24 and 25 and 26, as is well shown in Figure 2. Said prongs being arranged to prevent crop matter fouling the standards or from falling back over the blades.

The implement of the present invention is mounted on the two front wheels 27 and 28 and on the two rear wheels 29 and 30, and is arranged to receive traversable impulse from the tractor agent E by means of the pusher members 31 and 32 pivotally connected to the gear cases 33 and 34 of said tractor by the horizontal pins 35 and 36, well illustrated in Figures 1, 2 and 10. The forward ends of said thrust members are attached to brackets as 37 carried dependingly by said cross-piece, being secured thereto by the pivots 38 and 38, an arrangement of parts well adapted to impart propellance to the implement and admit relative up and down adjustment of the rear end of the implement as indicated by the dotted arc 39; for a purpose to be explained.

It will be noted that said rear wheels are mounted on the stems 40 which are carried non-revolubly in the bearings 41—41 attached to the respective frame members 11 and 12, and are provided with locking means as the set screws 42—42 for vertical adjustments of said stems.

The front wheel elements are both alike and comprise the wheels 27 and 28, the bifurcated bearings 43, the journals 44 extending upwardly therefrom and revoluble about the shoulder-axis 45 extending downwardly from the rack 46 and provided with retaining means as the nut 47 and the pin 48. Said journal has the flange 49 adapted to coact against the anti-friction means 50 interposed between said flange and the flange 51 formed on the lower end of said rack.

It will be noted that said rack is disposed vertically in the companion housing-members 52—52 with the teeth 53 facing rearward of the implement intermeshed with those of the pinion 54 fast to the shaft 55, between the cheeks 55a.

It should be observed that said housing members are arranged to form an elongated vertical socket in which said rack is slideable, said housing being bolted together by the through bolts 56, well shown in Figure 4. Each said housing is provided with the bosses 55b, and the lug pieces 57 adapted to engage said cross piece from the front and be secured thereto by the bolts as 58—58.

Braces as 59 extend from the upper end of said housing members to connect with a member of the frame structure, as shown in Figures 1 and 2.

*The vine breakers*

These novel elements project from the front of my implement at a deflecting angle and are disposed in midrow, the outer guide-straps 60 and 61 attached one on each side of said housing members by use of said through-bolts.

The lateral member 62 (see Figure 2) being preferably arcuate and provided with the series of bolt-holes 63 by means of which the angle of deflection of said element may be increased.

It will be noted by reference to Figure 7 that the inner guide-straps 64—64, integral with the keeper-block 65, fit within said outer straps, said block being provided with the two mortice-holes 65a by which means the inner straps may be slipped up within the outer ones to any required height and be held there by the bolts 66—66 which are regulably adjustable in slots as 67. It should be distinctly noted that said inner straps are relatively stationary, being moved up or down only when a different setting is required relative to the ground plane.

Said inner straps, at a suitable point above said block, are joined together by the abutment member 68, well shown in Figure 7. Both said block and member are bored to receive the round shaft 69 for axial play therein. The upper end of the shaft 69 is of square section to fit the square opening of the shield-guide F which latter is adapted to play up and down freely within said inner straps above said abutment, being retained in place by the cotter-pin 70.

The spring 71 is interposed between said abutment member and the thrust-washer 72 retained in place by the pin 73, an arrangement of parts which permits limited up and down movement of said shaft under spring control.

At a suitable distance below said block the shaft 69 broadens to form the portion 74 whose extreme end is rounded to form the arc 75 from which the sole-piece 76 extends horizontally rearward, and the shield lug 77 extends upwardly parallel with said portion and suitably spaced therefrom to afford space for the nuts 78 and 79 of the plow-bolts 80 and 81 which secure the lower end of the shield 82 and the finger piece 83 to said shield-lug; the shoe 84 is disposed axially beneath said sole-piece being secured thereto by the plow-bolts 85—85 and is provided with the upcurved toe 86 at the forward end which conforms to the arc 75 thereby constituting a sled-runner construction to prevent the device digging into the ground when traversing inclines; whereas said finger scores the surface to a slight depth so as not to miss any of the vines. Said plow-bolts having conical heads and square shanks fitting into square holes are adapted to be held against rotation when said nuts are being applied or removed, and being flush with the outer surfaces to which they are applied present no obstructions. I preferably construct the above parts of mild steel, but the shoe, having heavy duty, of tool steel.

The shield 82 is of steel plate, concaved to half-round as is well shown in Figure 6. It should be noted that while the lower end of said shield is secured as above described, the upper end thereof is secured to the shield-guide F provided with the arcuate limbs 87 and 88 conformable to the inner contour of said shield, said limbs being integral with the guide portion 89.

It is well seen that the guide prongs 90 are secured to the portion 74 being suitably spaced apart and flaring. The brace 91 connects the remote end of said shoe with the inner side of the shield-guide and serves as a stiffening means against vertical distortion of said shoe.

When moving, the entire implement is controlled from the operator's seat 92. The impelling movement is derived from the ground engaging wheels 93 and 94. In action the interrelated parts are as shown in Figures 2 and 1, wherein the implement is shown running on the wheels 27, 28, 29 and 30, the impellance being provided through the pusher members 31 and 32 projecting from the tractor.

When it is desired to make turns to right or left the vine-breaker elements are raised clear of the ground by suitable rotation of the hand wheel 95, thereby rotating the worm 96 acting on the worm gear 97 fast to the shaft 55, which in turn rotates the pinion 54 counter-clockwise and elevates the entire front of the structural body of the implement.

Next, a backward traverse of the lever 98, fast to the shaft 99 engages the latch 100 with the notch 101 and thereby raises the cranks 102 and 103. Said cranks being fast to said shaft and pivotally connected with the rear ends of the members 7 and 8 consequently elevate the entire rear end of the implement, lifting the wheels 29 and 30 clear of the ground, a position to be maintained by engaging said latch with said notch.

It should be understood that the wheels 29 and 30 do not swivel but are mounted for straight forward or backward travel, which is less expensive than caster-wheel construction.

It should be noted that while the hand wheel 95 and the lever 98 can be actuated independently, they are also arranged for simultaneous actuation, whereby time is saved by synchronously raising or lowering the implement fore and aft.

It will be noted that during the above operations the tractor enters into the train of agencies by providing an automotively-carried fulcrum, free to travel in any direction.

Although I have shown and described one embodiment of my invention, it is to be understood that the same is susceptible of various changes, and I reserve the right to employ such changes as may come within the scope of the claims hereto attached.

I claim:—

1. An implement of the kind described, comprising in combination, a frame, wheel-support for the front end of the frame, wheel-support for the rear end of the frame, scuffle blades disposed underneath the frame at oblique angles thereto, means connecting said blades with said frame; a tractor, vertically-adjustable pusher means linking the tractor to the forward part of said frame, means to raise and lower the front of said frame independently of the level of the tractor, means to raise and lower the rear of said frame independently of the level of the tractor, and dual simultaneously-operable independent means to alter the levels of both the front end and the rear end of said frame independently of the level of the tractor.

2. In an implement of the kind described having a structural frame with forwardly disposed members; vine-breaker elements arranged to be carried by said members, said elements comprising, guide straps carried deflectingly by said frame, a reciprocative shaft mounted in said guides, a shoe carried by said shaft, a shield carried by said shaft for pulsative, inclined up and down movement, and spring means to compel said downward movement.

3. In a vine-breaker element as specified in claim 2, means securing the lower end of said shield to a shield lug carried by the lower end of said pulsative shaft, said lug suitably spaced from said shaft, means securing the upper end of said shield to a shield-guide, said guide arranged for up and down movement with said shaft.

4. In a vine-breaker element as specified in claim 2, said shield secured to said shaft by upper and lower means, an upwardly-extending brace connecting the rear end of said shoe with said upper securing means.

5. In a vine-breaker element as specified in claim 2, the combination with said shaft; said shoe and said shield of; rearwardly-flaring guide-prongs carried by said shaft and suitably spaced intermediate said shoe and the upper end of said shield.

6. In combination with a tractor, a structural frame mounted on independent wheels, said frame comprising a front transverse member wider than the tractor, inner frame members extending backwardly toward the tractor, inwardly inclined members connecting the outer ends of said transverse member with the rear ends of said inner members to form the hypothenuses of two right angle triangles, parallel frame members extending backwardly from said inclined members so as to pass between said tractor and the driving wheels thereof to a point rearward of said tractor, a rear transverse member connecting the latter members and pusher members connecting said tractor with said structural frame of said implement.

In testimony whereof I affix my signature this 12th day of September, 1930.

ADOLF KERNS.